(12) United States Patent
Landskron

(10) Patent No.: US 12,098,583 B2
(45) Date of Patent: Sep. 24, 2024

(54) ACTUATOR FOR MOTOR VEHICLE APPLICATIONS

(71) Applicant: Kiekert AG, Heiligenhaus (DE)

(72) Inventor: Robert Landskron, Monheim (DE)

(73) Assignee: Kiekert AG, Heiligenhaus (DE)

( * ) Notice: Subject to any disclaimer, the term of this patent is extended or adjusted under 35 U.S.C. 154(b) by 189 days.

(21) Appl. No.: 17/793,429

(22) PCT Filed: Jan. 13, 2021

(86) PCT No.: PCT/DE2021/100032
§ 371 (c)(1),
(2) Date: Jul. 28, 2022

(87) PCT Pub. No.: WO2021/148081
PCT Pub. Date: Jul. 29, 2021

(65) Prior Publication Data
US 2023/0087426 A1    Mar. 23, 2023

(30) Foreign Application Priority Data

Jan. 21, 2020 (DE) .................... 10 2020 101 362.0

(51) Int. Cl.
| | |
|---|---|
| F16H 1/12 | (2006.01) |
| E05B 81/06 | (2014.01) |
| E05B 81/16 | (2014.01) |
| E05B 81/28 | (2014.01) |
| E05B 81/34 | (2014.01) |

(Continued)

(52) U.S. Cl.
CPC ............ *E05F 15/616* (2015.01); *E05B 81/06* (2013.01); *E05B 81/16* (2013.01); *E05B 81/28* (2013.01); *E05B 81/34* (2013.01); *E05B 81/90* (2013.01); *E05B 83/34* (2013.01); *F16H 1/125* (2013.01); *E05Y 2201/71* (2013.01); *E05Y 2400/3013* (2024.05); *E05Y 2900/53* (2013.01); *E05Y 2900/534* (2013.01)

(58) Field of Classification Search
CPC .......... F16H 1/125; E05B 81/06; E05B 81/16; E05B 81/28; E05B 81/34
USPC ........................................................... 74/351
See application file for complete search history.

(56) References Cited

U.S. PATENT DOCUMENTS 2,954,704 A * 10/1960 Saari ................... F16H 55/0853
74/459.5
4,226,136 A    10/1980 Porter et al.
(Continued)

FOREIGN PATENT DOCUMENTS

| DE | 3019524 A1 | 12/1980 |
|---|---|---|
| DE | 102010003044 A1 | 9/2011 |

(Continued)

OTHER PUBLICATIONS

International Search Report mailed Mar. 29, 2021, for priority International Patent Application No. PCT/DE2021/100032.

*Primary Examiner* — Ha Dinh Ho
(74) *Attorney, Agent, or Firm* — Renner, Otto, Boisselle & Sklar, LLP

(57) ABSTRACT

An actuator for motor vehicle applications, in particular for motor vehicle closing devices, comprising an electric motor, an actuating element which can be directly or indirectly acted upon via a drive train, and, arranged on a drive shaft of the electric motor, a drive wheel with an evoloid toothing, the drive train having at least one crown gear stage.

17 Claims, 1 Drawing Sheet

(51) Int. Cl.
*E05B 81/90* (2014.01)
*E05B 83/34* (2014.01)
*E05F 15/616* (2015.01)

(56) References Cited

U.S. PATENT DOCUMENTS

| | | | | |
|---|---|---|---|---|
| 5,022,690 | A * | 6/1991 | Coltrin | E05B 63/121 |
| | | | | 49/56 |
| 5,501,117 | A * | 3/1996 | Mensing | H02K 7/1163 |
| | | | | 74/423 |
| 7,306,536 | B2 * | 12/2007 | Ziech | B60K 17/36 |
| | | | | 180/24.09 |
| 2007/0007055 | A1* | 1/2007 | Schmidt | H02K 15/125 |
| | | | | 74/421 A |
| 2018/0238422 | A1 | 8/2018 | Tsujimoto et al. | |
| 2019/0285140 | A1 | 9/2019 | Suzuki et al. | |
| 2021/0348671 | A1* | 11/2021 | Hörmann | E05F 15/668 |
| 2021/0348673 | A1* | 11/2021 | Ma | F16H 1/16 |

FOREIGN PATENT DOCUMENTS

| | | |
|---|---|---|
| DE | 102017211803 A1 | 1/2019 |
| DE | 102017125819 A1 | 5/2019 |
| EP | 1363809 B1 | 12/2005 |
| EP | 3404290 A1 | 11/2018 |
| WO | 2013045104 A1 | 4/2013 |

* cited by examiner

ACTUATOR FOR MOTOR VEHICLE APPLICATIONS

This application is a national phase of International Application No. PCT/DE2021/100032 filed Jan. 13, 2021, which claims priority to German Application No. 10 2020 101 362.0 filed Jan. 21, 2020, each of which is hereby incorporated herein by reference in its entirety.

FIELD OF DISCLOSURE

The invention relates to an actuator for motor vehicle applications, in particular for motor vehicle closing devices, comprising an electric motor, an actuating element which can be directly or indirectly acted upon via a drive train, and, arranged on an output shaft of the electric motor, a drive wheel with an evoloid toothing.

BACKGROUND OF DISCLOSURE

Actuators for motor vehicle applications are used, for example, to adjust an exterior mirror, to adjust a seat, to adjust a headlight, or to set or adjust the windshield wipers. In addition, hinged elements such as a tailgate, a trunk lid, a motor vehicle door, an engine hood or the like can also be acted upon with the aid of such actuators.

In addition to these general motor vehicle applications for actuators, these actuators are also used in connection with motor vehicle closing devices and are employed in practice. Such motor vehicle closing devices are, for example, a closing drive for a motor vehicle door or a tailgate. In addition, so-called cinching latch strikers can also be moved with such actuators in order also to close a motor vehicle door. In addition, applications inside a motor vehicle door latch are conceivable, for example in such a way that individual latch elements, for example a locking element or central locking element, are acted upon. In addition, the actuator can also be used to lock fuel filler flaps or charging sockets in electric vehicles.

All of the fields of application known from practice for such actuators often require a compact design of the actuator because the installation space is cramped. Thus, within the scope of the generic DE 10 2010 003 044 A1, a multi-stage transmission device for adjusting a structural unit in a motor vehicle is described. The structural unit can be a seat adjuster, an exterior mirror adjuster or a headlight adjuster and, in principle, a window controller or other elements in or on the motor vehicle. The well-known multi-stage transmission device works with a first gear stage consisting of a worm and a spur or worm wheel meshing with the worm. A second gear stage is also implemented.

The second gear stage consists of an evoloid pinion and an output wheel meshing with the evoloid pinion. The spur or worm wheel engaging in the worm is coupled to the evoloid pinion. The evoloid pinion can be a plastics pinion. In this way, a compact transmission device is made available with which high torques can also be transmitted.

In the further state of the art according to WO 2013/045104 A1, a spindle drive for motorized adjustment of an adjustment element of a motor vehicle is described. In this context, a planetary gearing with a rotatable sun gear and a rotatable planetary gear carrier coaxial thereto is also realized. The engagement between the sun gear and the at least one planetary gear of the planetary gear carrier is designed as an evoloid toothing. In this way, the installation space required in the direction of the longitudinal axis of the drive is to be reduced overall.

Finally, the state of the art according to EP 1 363 809 B1, which is still relevant, relates to an actuator for adjusting the motor vehicle exterior mirrors. A mirror adjusting element which is coupled to the electric motor via the drive train is implemented for this purpose. The drive train has a main gear provided in the drive train in the vicinity of the mirror adjusting element. The main gear is connected to a pinion with evoloid toothing.

DE 10 2017 125 819 A1 has disclosed an actuator for motor vehicle applications, wherein an electric motor acts on a drive train, which in turn moves an actuating element. An evoloid pinion which forms a spur gear stage with an output wheel of the first gear stage is arranged in the drive train and preferably on the drive shaft of the electric motor.

The state of the art consequently shows, quite generally, actuators for motor vehicle applications which provide at least one evoloid toothing in their drive train. In this context, the evoloid toothing is implemented in the center of the drive train or adjacent to the actuating element in order to generally provide high transmission ratios at the output of the drive train with the aid of such an evoloid toothing. In contrast, in the state of the art, the drive train typically works with a worm gear at its input. This is where the invention starts from.

SUMMARY OF DISCLOSURE

The invention is based on the technical problem of providing such an actuator for motor vehicle applications so that, compared to the state of the art, an even more compact design is achieved, and, in particular, high transmission ratios are also made available with only one single gear stage.

Based on the known state of the art, the object is to provide an improved actuator for motor vehicle applications. In particular, the object is to provide a compact actuator that provides a large transmission ratio, has a high degree of efficiency, and at the same time can be reset.

The object is achieved by the features of the independent claim 1. Advantageous embodiments of the invention are specified in the dependent claims. It should be noted that the exemplary embodiments described below are not restrictive; rather, any options for variation of the features described in the description and the dependent claims and the drawings are possible.

According to claim 1, the object of the invention is achieved in that an actuator for motor vehicle applications, in particular for motor vehicle closing devices, is provided, comprising an electric motor, an actuating element that is directly or indirectly acted upon via a drive train, and, arranged on an output shaft of the electric motor, a drive wheel with an evoloid toothing, the drive train comprising at least one crown gear stage. The construction of the actuator according to the invention now makes it possible to provide a very compact actuator that enables high transmission ratios in one gear stage, while at the same time a high degree of efficiency of the gear stage can be achieved. By using the crown gear stage, a gear stage can be provided that requires a minimum of installation space. In particular, it is possible to form the center axis of the drive wheel at right angles or preferably almost at right angles with respect to a center axis of the output wheel. As a result, there is the possibility of arranging the output wheel in a direction of a longitudinal extension of the drive wheel and thus providing a gear stage that can essentially be limited by a width of the electric drive. The compactness of the transmission can thus be advantageously combined with a high transmission ratio and a high degree of efficiency. In addition, a crown gear stage offers the possibility of being reset, in other words the crown gear stage can preferably be reset manually. This in turn offers an advantage which, in the event of a failure of an electrical power supply, enables the actuating element to be reset manually.

The invention is based on the consideration that a crown gear stage has a better degree of efficiency than a bevel gear stage. During the rotary motion of a crown gear stage, there is no axial force between the pinion and the crown gear, or only a small axial force in the case of a helical toothing. On the other hand, the toothing of the crown gear and the pinion used to drive the crown gear can be produced comparatively easily, wherein the crown gear is preferably designed as a plastics component. A crown gear stage can thus be manufactured more cheaply than a bevel gear stage. A design that is optimized for rolling also improves the smooth running of the drive train.

In addition, the invention recognizes that the output shaft of a crown gear stage does not have to absorb any axial forces or, compared to a bevel gear stage, has to absorb only minimal axial forces. In the case of a spur gear pinion, the pinion can also be moved freely in the axial direction over the toothing of the crown gear without affecting the contact pattern or the backlash. The use of a crown gear stage therefore makes it possible to build the gear stage shorter in the axial direction.

The actuator described according to the invention can be used for all of the motor vehicle applications specified above. In particular, however, embodiments in connection with motor vehicle closing devices are advantageously implemented. This can be a closing drive, an opening drive, a cinching latch striker or the like. In addition, flap locks, such as a fuel filler flap lock, or also a lock on a charging socket in an electric or hybrid vehicle can be implemented with the aid of the actuator described.

In an advantageous embodiment variant, the drive wheel interacts directly with an output wheel designed as a crown gear. The use of the crown gear stage directly adjacent to the motor results in several advantages. On the one hand, it is possible to work without an axial distance between the drive shaft and the output shaft, that is, an axial distance of 0 mm can be provided at which the axes cross. In addition, the gear stage with the crown gear offers the advantage of forming a gear stage that requires very little installation space. For example, the actuator can be designed to be very flat, which means that a flat drive train can be achieved for the actuator overall. A compact design can be realized in particular through the combination of no or only a small axial distance between the wheel and pinion and the overlap between the drive wheel and the crown gear.

It can also be advantageous and can represent a further embodiment variant of the invention if the axis of the drive wheel and the axis of the output wheel intersect. If the actuator and in particular the first gear stage of the drive train is designed in such a way that the drive pinion on the output shaft of the motor is aligned directly in the direction of the axis of the output wheel, a design solution can be provided that requires minimal installation space. The drive wheel on the motor shaft is designed as an evoloid gear, which in turn allows positive engagement conditions to be realized between the drive wheel and the output wheel. In particular, a gear stage can be realized that is characterized by very smooth running. However, a major advantage of the crown gear stage is that a high degree of efficiency can be achieved. Small installation space, smooth running and a high degree of efficiency are advantages that can be combined by the arrangement according to the invention in the actuator.

If the axes of the drive wheel and the output wheel have an axial offset, a further embodiment variant of the invention results. According to the invention, it is also conceivable that an axial offset can be set between the driving gear and the driven gear. This results in design freedom that enables individual solutions based on the available installation space for the actuator. In automotive applications in particular, the available installation space is always limited. Design freedom in the design of the gear stages thus enables a maximum of design freedom, which in turn has a positive effect on the installation space required for the actuator. With the same performance of the actuator, the dimensions of the actuator can be adapted to the available installation space.

In a further embodiment variant, the drive wheel and the output wheel form a crown gear stage, wherein the crown gear stage forms a first gear stage of the drive train and the first gear stage drives at least a second gear stage. By driving a further gear stage by means of the crown gear stage, high transmission ratios can be achieved in the actuator. High transmission ratios then allow the required actuating forces for the actuating element to be provided. In combination with the high-speed electric motors that are used, high actuating forces as well as short actuating times for the actuating element can be achieved. Due to the possibility of achieving high transmission ratios in the gear stages, less powerful motors can be used, which in turn has a positive effect on the costs of the actuator. In addition, low-powered and/or small motors, i.e. motors with small dimensions, make it possible to further reduce the installation space for the actuator. The advantages of using a crown gear stage add up with regard to the installation space, the forces and the actuating speed of the actuating element.

If the second or a further gear stage has an evoloid toothing, a further advantageous embodiment variant of the invention results. The supplementary gearing can be equipped with one or more further evoloid toothings. The supplementary gear can also have gear stages with spur gear toothings or helical toothings in addition to or instead of evoloid toothings. In this way, a particularly compact embodiment of the actuator according to the invention is generally made available. Because of the evoloid toothing used, one or more gear stages can be omitted. This also means that the actuator according to the invention has or can have small dimensions. In addition, the overall weight of the actuator can be reduced as a result. In addition, evoloid toothings have better acoustics with less operating noise than spur gears with straight toothings, so that the background noise is also positively influenced. Not to mention that, such evoloid toothings are generally not designed to be self-locking, so that they can be moved manually if necessary and, in particular, can be reset manually.

If the gears of the gear stages are designed to be parallel to one another, a structurally advantageous solution can again be provided. If the axis of the crown gear of the first gear stage is arranged parallel to a second axis of a means of the second gear stage driven by the crown gear, a drive train for the actuator can be provided in the smallest installation space.

The compact design is a significant advantage of the arrangement of the drive train and in particular the use of at least one crown gear. For example, the actuator can be used to lock fuel filler flaps and/or a charging plug. There is generally little space available in charging plugs or on charging sockets or in the area of the fuel filler flaps. The installation space can be reduced to a minimum through the use of axially parallel gear stages, while at the same time the requirements for the actuator, for example for the actuating force, can be met.

The drive wheel can have one to four teeth, preferably three teeth. The drive wheel or the evoloid pinion preferably has three teeth. In principle, however, different numbers of teeth are also possible, for example only two or even only one single tooth or four or six teeth. In addition, the so-called normal modulus of the evoloid pinion is 0.5 and more. The modulus of a gear is generally understood to be a measure of the size of the teeth. As a rule, the modulus clearly describes the relationship between the diameter of the gear in question and the number of teeth. In the case of an evoloid pinion, the normal modulus is defined as the modulus in the normal section, i.e. in a surface of the toothing perpendicular to the flank lines. Here the invention uses a relatively small normal modulus of at least 0.5. As a result, high torques can be transmitted and no excessively large force peaks are observed in the evoloid pinion, so that even plastics can be used here for the realization.

If the gears of the gear stages are at least partially made of plastic, this in turn results in advantages for the invention. This means that the drive train can be composed at least partially of plastics gears. The same applies to the gearbox optionally provided in the drive train. The evoloid drive wheel and the crown gear as output wheel are preferably designed to be made of plastic. Transmission components made of plastic can be produced particularly inexpensively and are characterized by their low weight. In addition, a plastics pinion or a plastics gear runs very smoothly, more so than with a metal pinion or metal gear of otherwise identical dimensions.

In a further development of the invention, the actuator has an emergency release. The emergency release can be performed directly manually, for example by being gripped manually and the actuating element being movable. The emergency release can consist of a cable or a pulling element, so that the actuating element can be moved back from the position protruding from the actuator into the retracted position. However, it is also conceivable that, for example, a mechanical intervention in the actuating element is necessary, wherein the gear stage or the gear stages can be reset, for example, via an operating means, so that the actuating element can be moved. An emergency actuation or an emergency release is necessary if, for example, the actuating element is in an extended position and there is a power or voltage failure in the motor vehicle. In this case, it must be possible to reset the actuating element so that an emergency release is possible. Emergency release relates to the use of the actuating element to lock a charging plug, for example.

BRIEF DESCRIPTION OF DRAWINGS

The invention is explained in more detail below with reference to the attached drawings on the basis of a preferred exemplary embodiment. However, the principle applies that the exemplary embodiment does not limit the invention, but is merely an advantageous embodiment. The features shown can be implemented individually or in combination with further features of the description as well as the claims, individually or in combination.

In the drawings.

DETAILED DESCRIPTION

Figure 1:
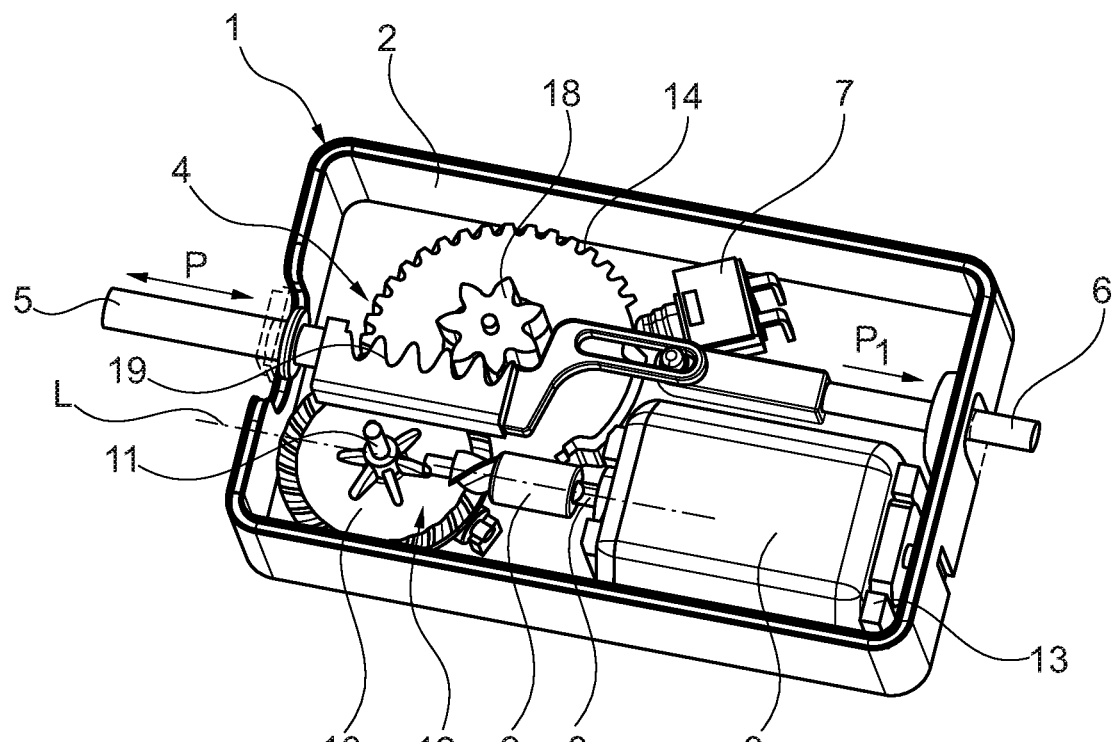
FIG. 1 shows a plan view of an actuator designed according to the invention with a view of the drive train, wherein only the components essential for explaining the invention are reproduced.
Figure 2:
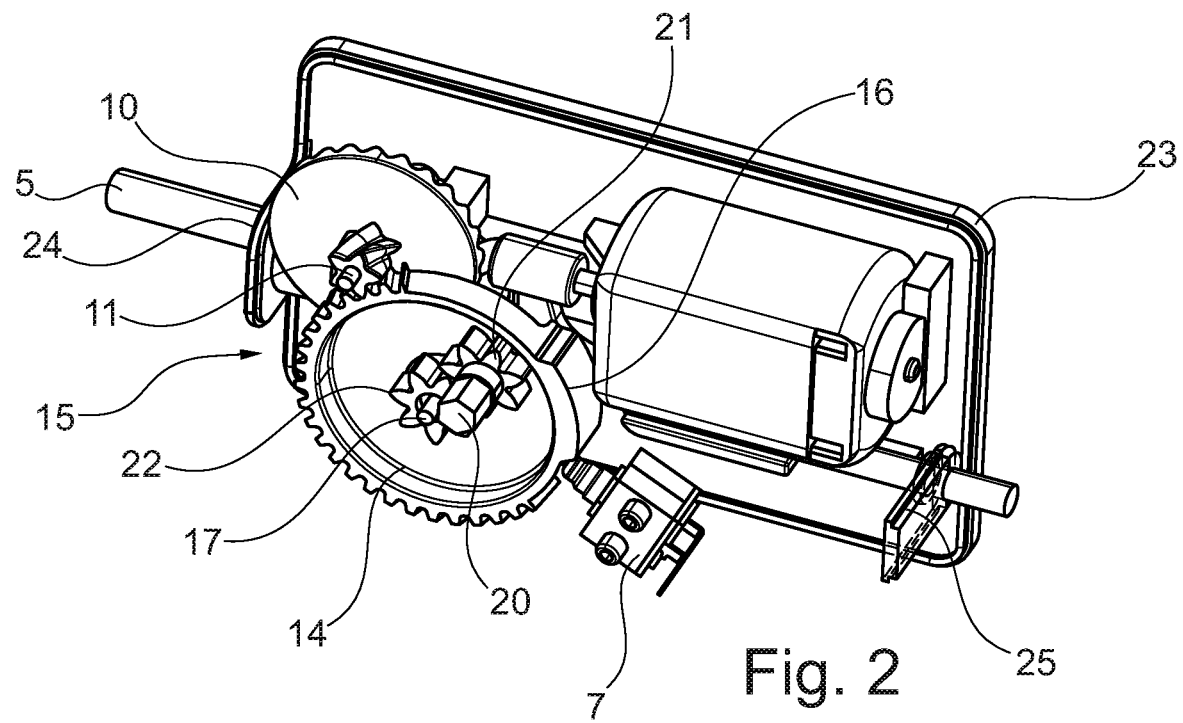
FIG. 2 shows a view of the drive train according to FIG. 1 from a rear view without a housing shell with a housing cover.

FIG. 1 shows an actuator 1 in a three-dimensional view and a view of a housing shell 2 with an integrated electric motor 3, a drive train 4, an actuating element 5, an emergency release means 6 and a switching means 7. The actuator 1 can be used, for example, to lock a fuel filler flap or a charging plug of an electric vehicle. In this case, the actuating element 5 serves as a bolt that can prevent the fuel filler flap from being opened or the charging plug from being pulled out during a charging process, for example. In this respect, FIG. 2 shows the locked state. The actuating element 5 has been moved out of the housing 2 of the actuator 1. The actuating element 5 can be moved in the direction of the arrow P out of the housing 2 or into the housing 2.

A drive wheel 9 is arranged on a drive shaft 8 of the electric motor 3, wherein the drive wheel 9 can be fitted onto the drive shaft 8, for example. The drive wheel 9 is designed as an evoloid gear 9 and meshes with a crown gear 10. In this exemplary embodiment, the evoloid gear 9 has three teeth. As illustrated by the dot-dash line L, the arrangement between the drive wheel 9 and the crown gear 10 is designed in such a way that there is no axial distance between the drive shaft 8 and the axis 11 of the crown gear 10. In other words, the axes 8, 11 intersect. The evoloid gear 9 and the crown gear 10 form a crown gear stage 12. It should also be noted that the electric motor 3 is accommodated in receptacles 13 of the housing 2 in a form-fitting manner.

As can be clearly seen in FIG. 2, the crown gear interacts with another gear 14 to form a second gear stage 15. In this exemplary embodiment, the second gear stage is designed as a spur gear stage. The gear 14 is provided with a toothing only in certain areas, and is additionally formed with a peripheral elevation 16 in some areas, wherein the elevation 16 can be brought into engagement with the switching means 7, in this case a microswitch. The gear wheel 14 thus serves, on the one hand, to transmit the torque to the actuating element and, on the other hand, to detect the position of the actuating element 5. The position of the actuating element 5 shown in these FIGS. 1 and 2 is the locked position, wherein the locked position corresponds to a release of the switching means 7. In the retracted state of the actuating element 5, the gear 14 or the elevation 16 is moved in such a way that the elevation moves into the effective range of the switching means 7 and the switching means 7 is actuated. It is thus possible to detect the position in which the actuating element 5 is located. The axes 11 of the crown gear and the axis 17 of the second gear 14 are arranged parallel to one another in this exemplary embodiment. This allows high transmission ratios to be implemented in the smallest installation space.

As can again be seen in FIG. 1, the gear 14 of the second gear stage 15 interacts directly with the actuating element 5. For this purpose, a further toothing 18 is formed on the gear 14, and engages directly in a toothing formed as a toothed rack 19 on the actuating means 5. In this exemplary embodiment, the drive train 4 is thus formed by the drive wheel 9, the crown gear 10, the gear 14 and the toothed rack 19, wherein the drive train 4 is driven via the electric motor 3, in this respect the electric motor 3 also forms part of the drive train 4.

The actuating element 5 is shown in the extended position in FIGS. 1 and 2. If there is a power failure in the extended position, the operator can move the actuating element 5 back into the released position with the aid of an emergency release means 6. For this purpose, for example, a handle part (not shown) which an operator can grasp and actuate can be arranged on the emergency release means 6. The actuating element 5 can thus be moved into an unlocking position by actuating the emergency release means 6 in the direction of the arrow P1.

FIG. 2 shows an alternative and second possibility for moving the actuating element 5. An actuating means 20 is equipped with a gear 21, wherein the gear 21 in turn meshes with a gear 22 of the second gear stage 15. If the actuating means 20 is moved, for example by means of a tool, the second gear stage 15 can then be moved, as a result of which the actuating element 5 can be moved into a locked or unlocked position. The gear 22 can preferably be assembled and manufactured independently of the gear, but it is also conceivable to form the gear 22 in one piece with the gear 14.

The actuating means 20 can thus serve as an emergency release means, but locking can also be carried out by means of the actuating means 20.

FIG. 1 shows part of the housing 2, in particular the housing shell 2, and FIG. 2 shows a housing cover for closing the housing 2. The actuating element 5, the emergency release means 6 and the operating means 20 can be guided out of the housing 2 through sealing means 24, 25, in particular elastic sealing means 24, 25.

As can be clearly seen in the figures, a compact construction of an actuator 1 can be realized by forming a crown gear stage 12 in combination with a second gear stage 15, wherein the advantages of the crown gear 12 enable construction with minimal external dimensions of the actuator 1. In addition, a high degree of efficiency, for example 0.88, can be achieved, which can be advantageously combined with the very smooth running of the crown gear stage and the transmission of large torques. In this exemplary embodiment, the gear stages 12, 15, 19, as well as the other components housing shell 2, actuating element 5, emergency release means 6, drive wheel 9, crown gear stage 10, 11, 12, receptacle 13, the gears 14, 15, 18, 21, 22, the toothed rack 19, the actuating means 20 and the housing cover 23 are made of plastic, which in turn has a positive effect on the smooth running, the weight and the costs of the actuator 1.

LIST OF REFERENCE SIGNS 1 actuator
2 housing shell
3 electric motor
4 drive train
5 actuating element
6 emergency release means
7 switching means
8 drive shaft
9 drive wheel
10 crown gear
11, 17 axis
12 crown gear stage
13 receptacle
14, 18, 21, 22 gear
15 second gear stage
16 elevation
19 toothed rack
20 operating means
23 housing cover
24, 25 sealing means P, P1 arrow
L line

The invention claimed is:

1. An actuator for motor vehicle applications comprising:
an electric motor having a drive shaft,
a drive train,
an actuating element that is directly or indirectly acted upon by the motor via the drive train, and
arranged on the drive shaft of the electric motor, a drive wheel with an evoloid toothing, wherein the drive train has at least one crown gear stage that includes a crown gear,
wherein the drive wheel and an output wheel form the crown gear stage, and wherein the crown gear stage is a first gear stage of the drive train and the first gear stage drives a second gear stage of the drive train that includes a gear wheel, and
wherein the actuating element includes a toothed rack, and the gear wheel of the second gear stage has toothing that engages with the toothed rack to move the actuating element.

2. The actuator according to claim 1, wherein the crown gear is an output wheel of the crown gear stage, and the drive wheel interacts directly with the output wheel.

3. The actuator according to claim 2, wherein an axis of the drive wheel and an axis of the output wheel intersect.

4. The actuator according to claim 2, wherein an axis of the drive wheel and an axis of the output wheel have an axial offset.

5. The actuator according to claim 1, wherein the second gear stage has an evoloid toothing.

6. The actuator according to claim 1, wherein an axis of the output wheel of the first gear stage and an axis of the gear wheel of the second gear stage are parallel to one another.

7. The actuator according to claim 1, wherein the drive wheel has one to four teeth.

8. The actuator according to claim 1, wherein-gears of the first and second gear stages are formed at least partially of plastic.

9. The actuator according to claim 1, further comprising an emergency release that releases the actuating element.

10. The actuator according to claim 1, wherein the drive wheel has three teeth.

11. The actuator according to claim 2, wherein a center axis of the drive wheel is at a right angle with respect to a center axis of the output wheel.

12. The actuator according to claim 1, wherein the second gear stage is a spur gear stage.

13. The actuator according to claim 1, further comprising a switch, wherein the second gear stage includes an elevation that engages with the switch for detecting a position of the actuating element.

14. The actuator according to claim 9, wherein the emergency release includes a cable element for pulling the actuating element.

15. The actuator according to claim 9, wherein the emergency release includes a gear that meshes a gear of a second stage of the drive train to move the actuating element.

16. An actuator for motor vehicle applications comprising:
an electric motor having a drive shaft,
a drive train,
an actuating element that is directly or indirectly acted upon by the motor via the drive train, arranged on the drive shaft of the electric motor, a drive wheel with an evoloid toothing, wherein the drive train has at least one crown gear stage that includes a crown gear, and an emergency release that releases the actuating element, wherein the emergency release includes a cable element for pulling the actuating element.

17. An actuator for motor vehicle applications comprising:

an electric motor having a drive shaft, a drive train, an actuating element that is directly or indirectly acted upon by the motor via the drive train, arranged on the drive shaft of the electric motor, a drive wheel with an evoloid toothing, wherein the drive train has at least one crown gear stage that includes a crown gear, and an emergency release that releases the actuating element, wherein the emergency release includes a cable element for pulling the actuating element, and wherein the emergency release includes a gear that meshes a gear of a second stage of the drive train to move the actuating element.

\* \* \* \* \*